E. R. WALKER.
MOTOR TIP WAGON.
APPLICATION FILED NOV. 5, 1919.

1,422,500.

Patented July 11, 1922.

Inventor
Edwin Robert Walker;

By Dodge and Sons
Associate Attorneys.

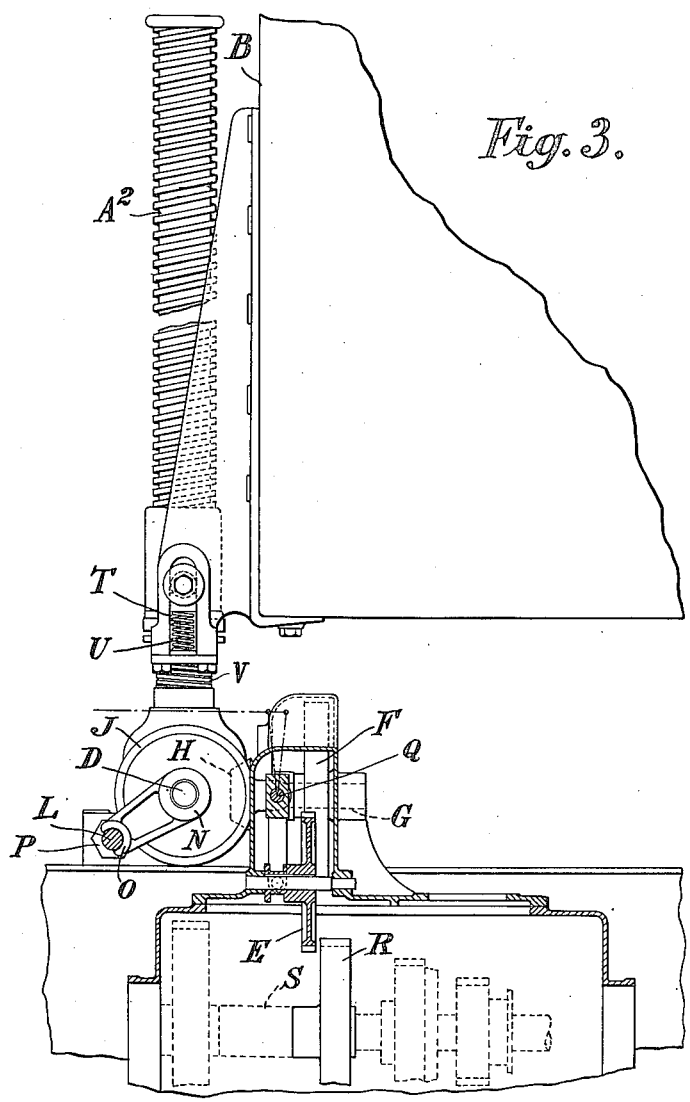

UNITED STATES PATENT OFFICE.

EDWIN ROBERT WALKER, OF WIGAN, ENGLAND, ASSIGNOR TO WALKER BROTHERS (WIGAN) LIMITED, OF WIGAN, ENGLAND.

MOTOR TIP WAGON.

1,422,500.            Specification of Letters Patent.      Patented July 11, 1922.

Application filed November 5, 1919. Serial No. 335,802.

*To all whom it may concern:*

Be it known that I, EDWIN ROBERT WALKER, subject of the King of Great Britain, residing at Wigan, in the county of Lancaster and Kingdom of England, have invented certain new and useful Improvements in Motor Tip Wagons, of which the following is a specification.

This invention relates to improvements in motor tip-wagons, and particularly to those in which the body of the wagon is tipped by means of a screw or screws, preferably telescopic operated from the engine or motor.

The invention provides improved mechanism by which the screw or screws is or are driven from the engine or motor shaft, and in conjunction with such driving mechanism I provide an arrangement of automatic trip gear whereby when the screw or screws has or have reached the appointed limits of travel in the operations of tipping the wagon body or returning it on to its frame, the driving mechanism for the screw or screws is automatically disconnected.

In this specification I will, by way of example, describe the invention in connection with tipping mechanism in which a pair of telescopic screws is used.

The invention will be understood from the following description, reference being had to the accompanying drawings in which:—

Figure 3 is a side elevation with the gear box in section.

Referring to these drawings, the telescopic screws A, mounted as usual on the front end of the wagon body B, are driven by the bevel wheels C, C' from a cross shaft D which in turn is rotated by bevel gearing driven from the engine shaft. In the arrangement illustrated the engine shaft is connected by spur gearing E and F to a counter-shaft G which carries a bevel wheel H in mesh with two crown or bevel wheels I and J loosely mounted facing each other on the cross shaft D. The arrangement is such that when one or other of these bevel wheels I, J is brought into driving connection with the shaft D the latter will be rotated in one direction or the other, for the purpose of raising or lowering the telescopic screws. To this end a clutch K is splined on the cross shaft D intermediate the two bevel wheels I J and adapted to engage one or other of them when slid axially on the said shaft, the other bevel wheel running idly. By this means the cross shaft can be driven in either direction from the engine shaft. The clutch member is carried and operated by a rod L mounted parallel with the cross shaft D and adapted to be moved axially so as to throw the clutch K from its neutral position into engagement with a clutch recess in the end of one or other of the bevel wheels I and J. A handle M is provided at one end of this rod L for the purpose of throwing in the clutch by hand from the neutral position to start the drive.

The automatic trip gear by which the clutch K is automatically brought into the zero or neutral position when the telescopic screws have reached their predetermined limits of travel is preferably constructed as follows. The cross shaft D is screw threaded for a suitable portion of its length and on this threaded portion D' travels a nut N having a jaw O adapted to slide on the clutch rod L, which is mounted parallel with the cross shaft D. Suitable stops are provided on the rod, such as locked nuts P. When the travelling nut N on the cross shaft D is approaching its limit of movement in either direction, the jaw O comes in contact with one of these stops P and moves the clutch rod L axially to such an extent as to force the clutch K out of engagement with one of the bevel wheels and bring it into the neutral position intermediate the pair of bevel wheels I J. In this position both bevel wheels run idly on the cross shaft D and the latter consequently stops and the telescopic screws also cease to be operated.

The nuts P are a convenient form of stop, which can be adjusted in position on the threaded portions of the rod L to regulate the degree of tilting imparted to the wagon body.

Means are provided to disconnect the engine shaft from the counter shaft G driving the tipping gear. For this purpose the spur wheel E which always in mesh with the wheel F is adapted to be shifted by a shifting lever and shaft Q into or out of gear with a spur wheel R on the lay shaft S.

Figure 1:
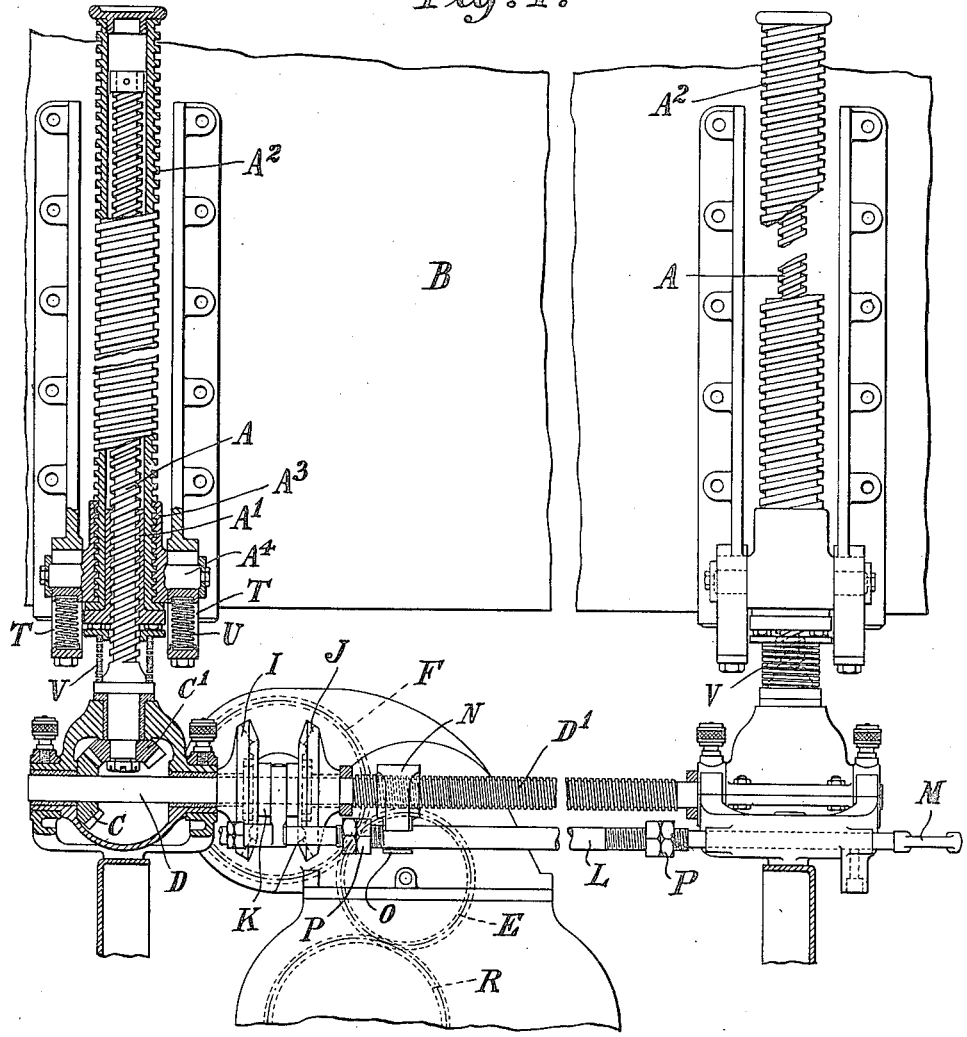
Figure 1 is a front elevation, partly in section, of tipping mechanism embodying my invention.
Figure 2:
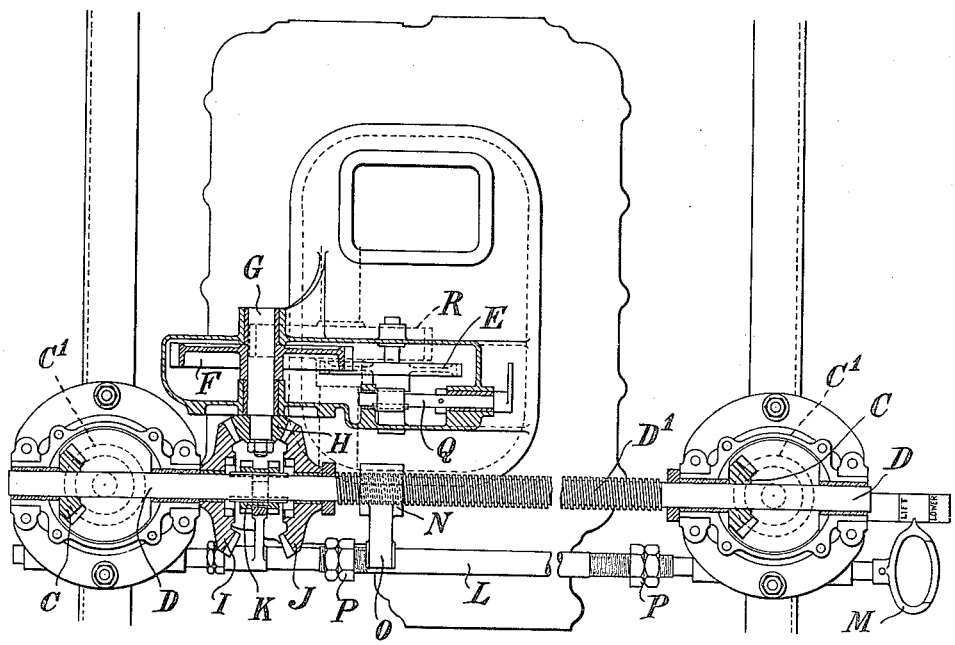
Figure 2 is a plan view, partly in section.

The operation of the mechanism will now be explained:—Assuming the wagon body is to be tipped, the operator takes hold of the handle M at the end of the clutch rod L and by pushing in the said rod a short distance to the left (see Fig. 2) the clutch K is put into engagement with the bevel wheel I. The spur wheel E is also shifted into gear with the wheel R. The shaft D will now be driven from the motor and drives by means of the bevel gears C, C' the telescopic screw mechanism which comprises the screwed shaft A, the internally threaded sleeve A', the threaded tubular shaft $A^2$ and the sleeve $A^3$. The tipping starts immediately the telescopic screws begin to be operated, the wagon body lifting by means of the trunnions $A^4$.

Referring now to the action of the trip gear; when the cross shaft D begins to revolve, the nut N thereon commences to travel, and as soon as it reaches its appointed limit of movement, corresponding to the extent of movement of the telescopic screws necessary to tip the wagon body, the jaw O come into contact with one of the stops P and the clutch rod L is moved to bring the clutch K into the zero position, whereupon of course the drive ceases. To return the wagon body to its normal position, the clutch K is put into gear with the bevel wheel J which causes the shaft D to revolve in the reverse direction and effect the lowering of the wagon body on to its frame.

In case for any reason the trip gear does not come into action at the precise moment required slots T are provided, which allow the cross shaft D to make one or more revolutions even after the wagon body is righted, thus avoiding stripping the screw threads or in any way straining or injuring the telescopic screws.

The springs U serve to prevent the trunnions $A^4$ forcibly striking the bottom of the slots T in the case of overtipping of the wagon body. V are cushioning springs for absorbing any shock when the body is returned on to its frame.

I declare that what I claim is:—

1. In a motor vehicle having a body adapted to be tipped by the power of the engine, a tipping arrangement comprising a screw mechanism for raising and lowering the vehicle body, a trunnion connection between the vehicle body and the screw mechanism, a shaft disposed across the end of said body for driving the screw mechanism, a pair of toothed gears loose on said shaft adapted to be driven from the engine, a clutch for locking one or the other of said gears in driving connection with the cross shaft, an axially slidable clutch rod mounted parallel with the cross shaft, and a nut capable of travelling on the cross shaft to move the clutch rod axially when the vehicle body has reached its appointed limits of travel so as to automatically throw the clutch into neutral position and stop the drive of the cross shaft.

2. In a motor tip-vehicle, a tipping arrangement comprising a screw mechanism for raising and lowering the vehicle body, a trunnion connection between the vehicle body and the screw mechanism, a shaft disposed across the end of said body for driving the screw mechanism, a pair of toothed gears loose on said shaft adapted to be driven from the engine, a clutch for locking one or the other of said gears in driving connection with the cross shaft, an axially slidable clutch rod mounted parallel with the cross shaft, a nut capable of travelling on the cross shaft to move the clutch rod axially so as to throw the clutch into neutral position when the vehicle body has reached its appointed limits of travel, and means for allowing the screw mechanism some amount of play so as to avoid injury to the said mechanism in case the drive is not automatically stopped at the proper moment.

In witness whereof, I have hereunto signed my name this 14th day of October, 1919, in the presence of two subscribing witnesses.

EDWIN ROBERT WALKER.

Witnesses:
G. C. DYMOND,
JOHN McLACHLAN.